US008825815B2

(12) United States Patent
Gidron et al.

(10) Patent No.: US 8,825,815 B2
(45) Date of Patent: Sep. 2, 2014

(54) SYSTEM AND METHOD FOR CLIENT SYNCHRONIZATION FOR A COMMUNICATION DEVICE

(75) Inventors: Yoad Gidron, Yokneam (IL); Rafael Ton, Yokneam (IL); Boris Shulman, Haifa (IL)

(73) Assignee: Amdocs Software Systems Limited, Dublin 3 (IE)

( * ) Notice: Subject to any disclaimer, the term of this patent is extended or adjusted under 35 U.S.C. 154(b) by 1071 days.

(21) Appl. No.: 12/216,810

(22) Filed: Jul. 10, 2008

(65) Prior Publication Data
US 2009/0177800 A1    Jul. 9, 2009

Related U.S. Application Data

(60) Provisional application No. 61/006,352, filed on Jan. 8, 2008.

(51) Int. Cl.
*G06F 15/177* (2006.01)
*H04L 29/08* (2006.01)

(52) U.S. Cl.
CPC ........... *H04L 67/1095* (2013.01); *H04L 67/34* (2013.01)
USPC ........................................... 709/221

(58) Field of Classification Search
CPC ......... H04L 67/00; H04L 67/04; H04L 67/34; H04L 67/1095; H04L 63/329; G06F 17/30581
USPC .................................. 709/220–222
See application file for complete search history.

(56) References Cited

U.S. PATENT DOCUMENTS

| | | | |
|---|---|---|---|
| 5,919,247 A * | 7/1999 | Van Hoff et al. | 709/217 |
| 2004/0005873 A1* | 1/2004 | Groenendaal et al. | 455/410 |
| 2004/0006630 A1 | 1/2004 | Friend et al. | 709/229 |
| 2004/0093342 A1* | 5/2004 | Arbo et al. | 707/102 |
| 2005/0220080 A1* | 10/2005 | Ronkainen et al. | 370/352 |
| 2005/0289265 A1* | 12/2005 | Illowsky et al. | 710/104 |
| 2006/0080397 A1* | 4/2006 | Chen et al. | 709/213 |
| 2008/0112556 A1* | 5/2008 | Modarressi et al. | 379/229 |
| 2008/0114830 A1* | 5/2008 | Welingkar et al. | 709/203 |
| 2008/0148042 A1* | 6/2008 | Brown et al. | 713/154 |
| 2008/0263170 A1* | 10/2008 | Caron et al. | 709/207 |
| 2008/0263470 A1* | 10/2008 | Murman et al. | 715/772 |
| 2009/0143052 A1* | 6/2009 | Bates et al. | 455/414.2 |

FOREIGN PATENT DOCUMENTS

EP    1 710 979    10/2006    ............. H04L 29/06

OTHER PUBLICATIONS

Oracle Database Lite 10gR3 Technical White Paper. http://www.oracle.com/technology/products/lite/tWP_Lite_l0gR3.pdf. May 2007. pp. 1-15.*
OMA DS Protocol. Approved Version 1.2. http://www.openmobilealliance.org/technical/release_program/docs/copyrightclick.aspx?pck=DS&file=V1_2-20060710-A/OMA-TS-DS_Protocol-V1_2-20060710-A.pdf. Jul. 2006. pp. 1-90.*
Synchronizing and Managing Mobile Devices. http://www.ars2000.com/datasync_whitepaper.pdf. Sybase. pp. 1-9. May 25, 2006.*

(Continued)

*Primary Examiner* — John MacIlwinen
(74) *Attorney, Agent, or Firm* — Zilka-Kotab, PC

(57) ABSTRACT

A system and method for synchronizing data between a communication device and a server, through an agent installed on the device.

31 Claims, 10 Drawing Sheets

(56) References Cited

OTHER PUBLICATIONS

European Search Report from Application No. 09150257 dated Apr. 29, 2009.
Open Mobile Alliance, DS Protocol Approved Version 1.2 OMA-TS-DS Protocol-V1_2-20060710-A, http://www.openmobilealliance.org/release_program/docs/ds/v1_2-20060710-A/OMA-TS-DS_Protocol-V1 2-20060710-A.pdf, Jul. 10, 2006, pp. 13-15 (90 pages).
iAnywhere, Whitepaper: Synchronizing and Managing Mobile Devices1 http://web.archive.org/web/20061212231451/www.ianywhere.com/downloads/whitepapers/sync_managing_wp.pdf, Mar. 2006, pp. 1-8 (8 pages).
Open Mobile Alliance, Device Management Requirements Approved Version 1.2, OMA-RD-DM-V1_2-20070209-A, http://www.openmobilealliance.org/technical/release_program/docs/DM/V1_2_1-20080617-A/OMA-RD-DM-V1_2-20070209-A.pdf, Feb. 9, 2007, pp. 13-29 (62 pages).
Open Mobile Alliance, Provisioning Architecture Overview Candidate Version 1.1, OMA-WAP-ProvArch-V1_1-20050428-C, http://www.vallejo.cc/proyectos/envio%20sms_files/OMA-WAP-ProvArch-v1_1-20050428-C.pdf, Apr. 28, 2005, pp. 8-13 (19 pages).
Examination Report from European Application No. 09150257.5, dated Feb. 24, 2011.

* cited by examiner

SYSTEM AND METHOD FOR CLIENT SYNCHRONIZATION FOR A COMMUNICATION DEVICE

This Application claims priority from U.S. Provisional Patent Application No. 61/006,352; filed on 8 Jan. 2008; which is hereby incorporated by reference as if fully set forth herein.

FIELD OF THE INVENTION

The present invention is of a system and method for device data synchronization, particularly for performing such synchronization between a telephone and a server, over a packet-data network.

BACKGROUND OF THE INVENTION

Digitally enabled telephones and other connected devices, including cellular telephones, so called "smart phones", Java enabled phones and VoIP telephones (telephones which communicate through the "Voice over IP" protocol, also known as Internet telephones) are all able to communicate with a server. Unlike simple analog telephones, this ability to communicate with a server increases the variety and type of services which may be offered through such telephones. For example, one type of service which may be offered is the ability to synchronize data with a server.

In order to support such synchronization, various protocols and standards are known, including the Open Mobile Alliance Data Synchronization (OMA DS) protocol. This standard, which is also known as SyncML (its former name), defines a protocol for a platform-independent information synchronization. SyncML is most commonly thought of as a method to synchronize contact and calendar information (PIM) between some type of handheld device and a computer (personal, or network-based service), such as between a mobile phone and a PC or a Server. However, from the experience of many mobile operators that launched SyncML services, it has been found that SyncML is a technology that fails to meet the requirements of a commercial mobile data service. Among the many significant deficiencies of SyncML are the manual configuration and initiation which are required in most implementations and which are difficult for the average user to perform, and the limited support for content, which is mostly PIM. Thus clearly a better solution is desired.

SUMMARY OF THE INVENTION

There is thus an unmet need for, and it would be highly useful to have, a system and method for seamless data synchronization between a device and a server, which is easy to install and to configure, and which also provides support for a wide variety of content.

Before turning to a description of the present invention, a list of abbreviations is provided:
Abbreviations
BREW, Binary Runtime Environment for Wireless
CDMA, Code Division Multiple Access
CIR, Communication Initiation Request
CLDC, Connected Limited Device Configuration
CRC, Cyclic Redundancy Check
DS, Data Synchronization
ESN, Electronic Serial Number
GSM, Global System for Mobile communications
GUID, Global Unique Identifier
GW, GateWay
HTTP, HyperText Transfer Protocol
HTTPS, HTTP Secure
IMC, Internet Mail Consortium
IMEI, International Mobile Equipment Identity
J2ME, Java 2 Mobile Edition
LUID, Local Unique Identifier
MIDP, Mobile Information Device Profile
MMS, Multimedia Messaging Service
MSISDN, Mobile Subscriber ISDN Number
OMA, Open Mobile Alliance
OTA, Over The Air
PC, Personal Computer
PDU, Protocol Data Unit
PIM, Personal Information Management
PLMN, Public Land Mobile Network
PSDN, Public Switched Data Network
RMS, Record Management System
SIM, Subscriber Identity Module
SIP, Session Initiation Protocol
SMS, Short Message Service
SMSC, Short Message Service Center
SSL, Secure Socket Layer
STK, SIM ToolKit
SyncML, Synchronization Markup Language
UDP, User Datagram Protocol
UI, User Interface
URL, Uniform Resource Locator
VPN, Virtual Private Network
WAP, Wireless Application Protocol
XML, eXtended Markup Language The present invention overcomes the disadvantages of the background art by providing a system and method for synchronization of data between a device (client) and a server and between a device and a plurality of one or more other devices and/or applications via the server. The present invention is simple to install, configure and use, and provides support for a wide variety of data types. The data that is exchanged between the device and the server optionally and preferably includes but is not limited to one or more of PIM (contacts, calendar, tasks, notes), media (images, video, audio) and other types of files, messages (SMS, MMS, Email), call log information and/or files, bookmark information and/or files and configuration information and/or files.

The device is optionally and preferably capable of one or more of voice and/or video communication, messaging (more preferably one or more of SMS, MMS or EMS) or the like; for example the communication device is optionally a telephone, IP telephone and/or cellular telephone. The device preferably comprises an agent which communicates with a synchronization server on a server through a wireless network, a computer network or a combination thereof, for example (and without limitation), cellular networks (GSM, GPRS, UMTS, CDMA, etc.), wireless networks (WiFi, WiMax, etc.) and the Internet. The agent and the synchronization server preferably communicate according to a proprietary protocol for synchronizing one or more data items, whether automatically or manually.

The device preferably contains some kind of local storage, including but not limited to a flash memory, memory card, SIM card or a hard disk. Optionally and preferably the device is capable of voice and/or video communication.

The agent according to the present invention is preferably operative over a wide variety of platforms and more preferably is "device agnostic" such that it preferably operates without regard to the type of device. The agent may optionally be provided by the device manufacturer, using standard protocols such as OMA DS (Open Mobile Alliance Data Synchronization, aka SyncML). Optionally, the agent may be implemented using platforms including but are not limited to Java Micro Edition (J2ME), Symbian, Windows Mobile, Mobile Linux (Android, LiMo, etc.), or Apple iPhone®, BREW, STK, Windows (PC Client), or the like. The agent communicates with the server according to the mSync protocol of the present invention as described in greater detail below. Optionally the agent is implemented as a J2ME MIDlet. The J2ME runtime environment is based on a virtual machine that runs on top of the phone's operating system and provides restricted access to some of the resources of the phone. The basic J2ME profile for mobile phones is the Mobile Information Device Profile (MIDP), but there are additional optional libraries that are available for accessing PIM data and the file system. Optionally and preferably, implementation of the agent also uses the SIM Toolkit (STK), which enables the development of JavaCard applets that run on the SIM card. The STK environment is very limited in terms of functionality and space, but it provides essential access data that is stored on the SIM card, including the address book. The present invention, in some embodiments, optionally and preferably uses SMS as a bearer for communicating with the STK application, or more preferably uses Bearer Independent Protocol (BIP) which allows SIM cards to download data through a cellular telephone's high speed data channel, like GPRS and/or UMTS for example, onto the SIM.

The device may also optionally be characterized as a limited resource device. Hereinafter, the term "limited-resource device" refers to a computational device in which computational resources such as memory, storage space, network bandwidth and/or data processing capabilities are limited, particularly in comparison to desktop computers such as PCs (personal computers), for example.

Among the many advantages of the agent according to the present invention over that of the known native (embedded) OMA DS (SyncML) client include but are not limited to the following.

Remote Initiation—The agent of the present invention may optionally be initiated remotely by the server and performs a batch session, without any user intervention. Although OMA DS specification includes support for remote Sync initiation, most OMA DS implementation lack support for this important functionality. Remote initiation is preferably enabled through Communication Initiation Requests (CIRs) which are sent by the Sever in order to wake up the agent and start a specific session. CIRs can be sent over different protocols such as SMS, UDP and SIP. The device must be addressable through a mobile number (MSISDN), IP address or URL.

The actual invocation of the agent depends on the platform. J2ME Applications are registered in the MIDP Push Registry with a specific port number. When an SMS message is sent to the device with this port number, the J2ME Application Management Software (AMS) starts the registered application. Once started, the application reads the content of the SMS and starts the request session.

In Symbian and Windows Mobile the application listens in the background to all incoming SMS messages. Once it identifies an SMS that was sent to a specific port of sent from a specific source, it reads the content of this SMS and starts the request session.

The CIR itself preferably includes the following information: a command, including but not limited to Sync, Backup, Restore, Wipeout (i.e. delete all data); the type of media involved, including but not limited to Contacts, Calendar, Files, Messages; the initiator of the CIR, including but not limited to Manual (Web), Scheduler, CRM; and the signature, which is a result of MD5 function on the Command and a key for identifying the device. The CIR is accepted only if the signature is valid, based on the private key of the device as described in greater detail below.

Media—While most OMA DS implementations support only PIM data (contacts, calendar, tasks, notes), the Agent supports also media files, such as pictures, video and audio. The other OMA DS implementations send such data as XML files encoded according to base 64, which significantly increases the traffic load and processing overhead. However, the agent according to the present invention preferably avoids such problems by sending lower overhead data, for example optionally and preferably by transferring binary files through HTTP POST, which allows much larger files to be transmitted.

Transparent configuration—The OMA DS client can be activated only after the user receives and accepts OTA settings from the operator. With the Agent, configuration is done in a transparent manner, and the Agent is ready for use without user intervention. Setting and configuration parameters are preferably stored on the server and delivered to the client upon installation and upgrade. This central mechanism provides a smooth upgrade and enables to control the settings of multiple devices for the same account (user) and provides a transparent configuration.

OTA upgrades—The mSync Agent can be easily upgraded over-the-air when needed, as a downloadable application (software). This upgrading process is much more complicated and expensive for embedded applications (firmware) in general, including OMA DS client, than for downloadable software applications such as the agent of the present invention.

Minimal dependency on the device—The agent design is device agnostic; there is preferably only one version of the agent per platform, such that all devices sharing the same platform preferably are also able to use the same version of the agent. All the knowledge about the capabilities and limitations of specific devices is managed by the server. Thus, the agent is highly portable, such that the introduction of a new device based on an existing platform and/or new features to such an existing device does not require code changes on the client side.

Branding—The Agent UI (user interface) and flow may preferably be customized (icons, menus, language, etc.) per operator and/or service through the server, rather than changing or customizing the agent itself. This is not possible with native OMA DS clients, which are provided by device manufacturers. Furthermore, the menu options of the Agent may optionally be customized in run-time through settings that are determined and/or controlled by the server.

The mSync protocol according to some embodiments of the present invention enables bi-directional synchronization of data between an msync client (agent) and an msync server. The protocol supports any type of data, including but not limiting to the following content types:

Contacts (vCard format)
Calendar events (vCalendar format)
"To do"/tasks (vCalendar format)
Notes (vNote format)
Files (binary format)
Messages (SMS and MMS)

The protocol is extendible and can support any MIME type.

The protocol preferably supports the following batch sessions, which does not require any user interaction. These sessions are transparent to the user and are implemented either automatically, for example, for periodic data synchronization, or upon user request, using propriety GUI or a WEB browser for example for performing a backup. The protocol preferably supports at least the following sessions:

Synchronization—Bi-directional exchange of changes that were made to relevant data elements on the device and the server.

Backup—Full transfer of relevant data elements from the device to the server.

Restore—Full transfer of relevant data elements from the device to the client.

Wipeout—Deletion of all data from the device and optionally blocking of the device in the system (for example, for cases where the device is lost or stolen).

In addition to these batch sessions, the protocol optionally supports interactive sessions in which user interaction is needed for completing the session. These sessions are supported by a GUI or through a web browser. The protocol preferably supports at least the following sessions:

Upload—The user selects specific files from device and uploads them to the server.

Download—The user selects specific files from server and downloads them to the device.

The OMA DS (SyncML) protocol does not include important capabilities that are included in the mSync protocol, for example:

Chunks—The mSync protocol includes a flexible and fault-tolerant mechanism of splitting large amount of data (textual or binary) into multiple chunks, thus dealing with memory and networking constraints of each device. Although OMA DS supports chunks as well, it doesn't allow the client to access a specific chunk and in cases of failure the whole transmission must be re-started as opposed to the mSync protocol which can continue the transition after recovering from the failure by restarting the transition from the last sent chunk.

Wipe-out—The msync protocol supports the capability to remotely wipe-out (deleting) data from the device. This is implemented by a CIR (Communication Initiation Request) command. CIRs are sent by the Sever in order to wake up the agent and start a specific session. CIRs can be sent over different protocols such as SMS, UDP and SIP.

Customization—The mSync protocol is highly customizable and allows the operator to embed special messages or asking the end-user for confirmation in the occurrence of specific events (e.g., the user is roaming or exceeded his quota). This mechanism, known as Generic Dialog, optionally allows the server to provide a message or a question to the user on-the-fly and get the user's response or change the flow accordingly. The Agent is not pre-configured with this logic, but rather accepts the information from the server in run-time.

Enhanced security—The mSync protocol uses symmetric private keys that are distributed to each device by the server via a secure channel (either HTTPS or SMS), upon the activation of a new client. These keys are first used for the Secure Challenge Login. In further interactions, the server preferably verifies the matching between the Ukey and the identity of the user for detecting an event of changing a SIM card in the device. This mechanism, which is not supported by OMA DS, allows the server to detect a new device in the system or changing of devices and to allow, warn or block the operation according to the required policy.

Browsing & Download—The mSync protocol allows the client to browse for content that resides on the server, get previews and select specific files for download. This capability is not in the scope of OMA DS.

Meta Information—The mSync protocol can transfer information that is not included in the vCard itself, such as groups, ringtones and photos (in some devices). This information is preferably accessed by the mSync Agent for the user via dedicated API that is provided by the device. This functionality is not specified by OMA DS.

Consistency—The mSync mechanism for checking if a contact/event has changed is more fault-tolerant than OMA DS. In OMA DS, sanity is evaluated by comparing timestamps, whereas mSync continuously keeps sanity by comparing CRCs generated at runtime, in each synchronization. Thus, in mSync there is no need to do a "full-sync" every once in a while to maintain integrity, even if an error (caused by server or client) previously occurred.

Efficiency—Media files are transferred by the mSync protocol in their original binary format. This is much more efficient than encoding them in Base64 format, as defined in the OMA DS protocol.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "device" on a "wireless network", featuring a "server" and preferably for cellular communication, it should be noted that optionally any device featuring a data processor and/or the ability to execute one or more instructions with the ability to support at least voice communication may be described as a telephone, including but not limited to any type of telephone enabled computer, a cellular telephone, an IP telephone (software (virtual) device or real (hardware) device), a smart phone, a PDA (personal digital assistant), or a pager. Any two or more of such devices in communication with each other, and/or any computer in communication with a telephone may optionally comprise a "wireless network", which may (for example) optionally be a computer network and/or a cellular network.

A "server" as termed herein may optionally comprise any computer that is connected to an IP network. It should be noted that optionally any device featuring a data processor and/or the ability to execute one or more instructions may be described as a computer, including but not limited to a PC (personal computer), a server, a minicomputer. Any two or more of such devices in communication with each other, and/or any computer in communication with any other computer may optionally comprise a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
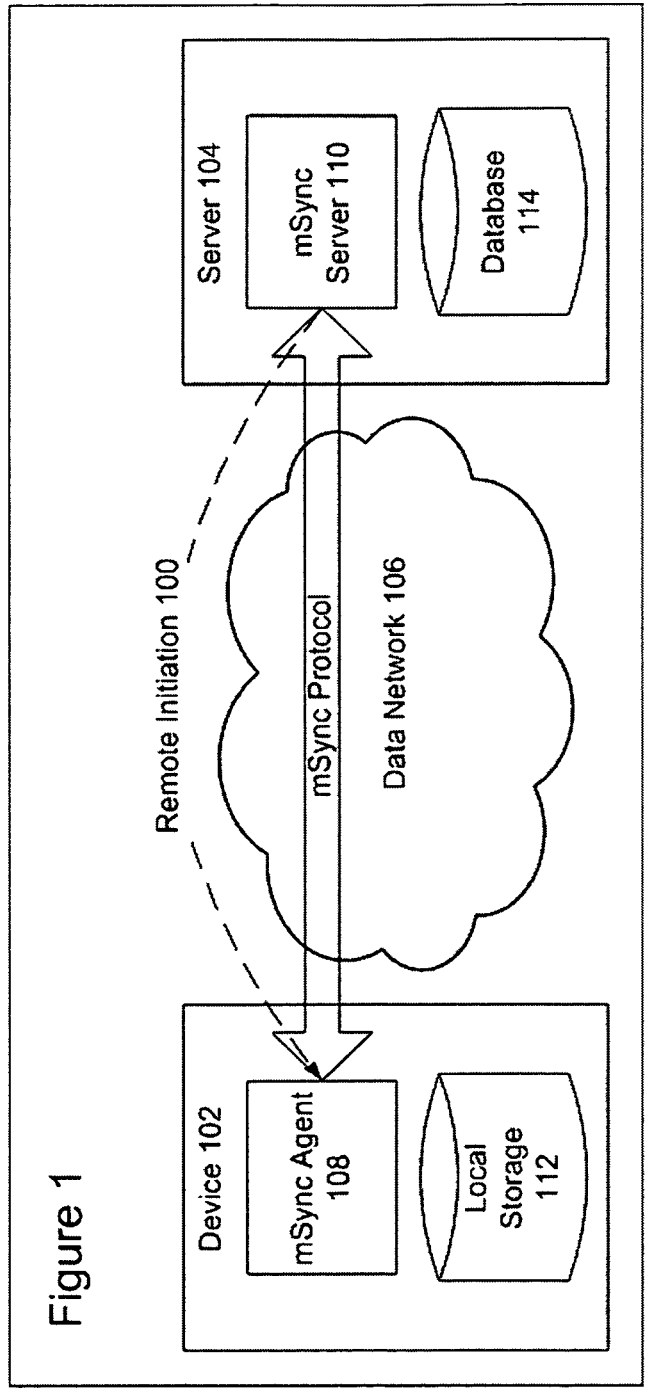
FIG. 1 is a schematic block diagram of an exemplary system according to the present invention.

The present invention is of a system and method for synchronization of data between a device (client) and a server and between a client to one or a plurality of clients and/or applications via the server. For example the client can be a cellular telephone that synchronizes the contact information data (and/or other data) with other cellular telephones or with other applications, such as Microsoft Outlook® or Google® mail. The data that is exchanged between the device and the server optionally and preferably includes but is not limited to one or more of PIM (contacts, calendar, tasks, notes), media (images, video, audio) and other files, messages (SMS, MMS, Email and so forth), call log information and/or files, bookmark information and/or files and configuration information and/or files. The synchronization is preferably performed according to a method, in some embodiments of the present invention, which preferably features a proprietary protocol.

The proprietary synchronization protocol of the present invention is optionally and preferably operable for interactions between the device and the server, such that more preferably a majority of the operations are handled by the server.

According to some embodiments, the proprietary protocol is optionally implemented according to XML over HTTP, or optionally with an SMS variant for communication with a SIM Toolkit (STK). If wired solution is used, most of the interaction between the client and server (device and server) is preferably transferred over HTTP or HTTPS. While the session is managed in a standard manner (e.g., through a cookie or session ID in the URL), the protocol preferably features proprietary HTTP headers in order to manage data exchange. The protocol preferably uses XML in order to exchange meta-data and the content itself is transferred in its original format: for example, vCard for contacts, vCalendar/iCalendar for calendar events and tasks, vNote for notes, vBookmark for bookmarks, and binary format for media and other files.

A simplified variant of the protocol is preferably used for interacting with the SIM Toolkit. In most cases, the STK application can only use the signaling channel for communication, and thus SMS is used as a transport layer for the protocol.

The method of the present invention has many advantages over SyncML, of which a few non-limiting examples include automatic configuration, the ability to initiate one or more activities of the client from the server, the ability to communicate information from one client to a plurality of clients and support for a wide range of content types, including media files, such as images, audio and video.

According to preferred embodiments of the present invention, the device comprises an agent for communicating with the server. The agent is preferably a thin client that is installed on the device and handles the synchronization of data with the server; alternatively, the agent can be provided by the manufacturer of the device. More preferably, the agent features an elementary user interface since it performs most of its operations in the background in a transparent manner. The agent may optionally perform synchronization automatically without any user intervention, although optionally and more preferably, the user is able to select one or more specific content items to be uploaded to, or downloaded from, the server. The agent can be initiated remotely by the server or started manually by the user.

Optionally and preferably, the agent comprises a minimal functional and/or logic set, such that most of the work is done by the server. The agent is responsible for reading data from the device, detecting changes since last sync, and sending data to the server. The agent detects the changes by calculating a global CRC which is composed of the CRC of each item and comparing it to the previous global CRC. In the other direction, the agent is responsible for receiving data from the server and writing it to the device; optionally the user may control or manage such processes manually. The responsibility of the server is to resolve conflicts, avoid duplicates and reformat the data according to the capabilities and limitations of the specific device, store the data that is received from the agent and, optionally retrieve it to the agent upon request or forward it to one or a plurality of agents.

Optionally and preferably management of device capabilities is handled by the server. The repository of device capabilities allows the server to adapt the data that is sent to the client to the capabilities and limitations of the target device. On the other direction, the server optionally uses this repository in order to handle data that is received from the client and to merge it correctly with data is stored in the database. The database optionally and preferably always contains the data in its richest format and if a specific device supports a reduced format, the synchronization process preferably does not cause loss of data.

The database optionally includes the profile per each device. The information described herein is optionally comprised in each profile:

Preferred Client type: J2ME, Symbian, Windows Mobile, SyncML, etc.

vCard formatting rules: supported properties and parameters, restrictions vCalendar formatting rules: supported properties and parameters, restrictions.

Calendar restrictions: various limitations of calendar support

Capacity limitations: the maximal number of items in a specific data store (e.g., maximum number of contacts) or maximal total capacity in a local storage.

File system directories of the device: image, audio, video and other directories on phone memory and/or memory card.

Categories mapping: mapping of local category names to global category names (e.g., for events) for situations in which there are local names for such categories for each type of device, while the global category names are used for consistency at the server and also preferably within the system according to the present invention.

Platform-specific parameters which relate to the particular devices and/or their underlying technological platform.

Most devices use vCard and vCalendar formats in order to export and import contacts and calendar events (including tasks). These standard formats, originally defined by the Internet Mail Consortium (IMC), consist of properties, where each property is identified by a name, optionally described by parameters, and has a value. The value may be compound, containing multiple components (e.g., Last name; First name, etc.). Although vCard and vCalendar are standards, each device supports only a subset of the defined properties and imposes limitations on the allowed properties and value components. The formatting rules have 2 purposes:

A vCard/vCal that is generated by the server and sent to the client is formatted according to the rules of the target device. A malformed vCard/vCal may cause an error during import or lead to unexpected results. The server may also decide to split a single vCard/vCal to multiple instances due to limitations of the device (e.g., the device doesn't support recurring events).

vCard/vCal that is exported by the device and sent to the server is merged with an existing record (if exists) according to the formatting rules. These rules allow the server to distinguish between a property that was deleted in the device and a property that is missing simply because the device does not support it.

Various devices may fail to support common calendar capabilities including but not limited to:

Time zones and daylight saving time

All day events

Recurring events without an end date

Yearly/monthly/weekly/daily recurring events

This is especially problematic with events that were created in advanced calendar applications (e.g. Microsoft Outlook®) and synchronized to mobile devices. In order to support these devices and provide a good user experience, the server preferably adjusts the events per device, by at least one or more of the following actions:

Adjusting the time of the event to the local time of the device

Replacing all day events with events that span one day

Adding an end date to endless recurring events

Splitting recurring events to multiple events per year/month/week/day

The general structure of a vCard/vCal is a sequence of textual lines in the format of:

Property name; Parameters: Property value

For example, the following line:

TEL;CELL: 0543222111 represents a mobile phone number with the value of 0543222111

For each device, or device family, the supported formatting rules preferably include but are not limited to one or more of the following: supported standard and proprietary properties per vCard/vCal; for example telephone number or email address for vCard properties, SUMMARY, RRULE for vCalendar properties.

Other supported rules preferably include but are not limited to supported parameters per property; for example cellular number, home number, work number or fax number parameters of the telephone property; supported value components per property; for example last name, first name, middle name; Supported maximum number of occurrences per property; for example up to five telephone number properties; supported maximum number of occurrences per parameter in the case of multiple properties with the same name; for example only one mobile number is allowed; Supported exclusion between properties—properties that cannot appear together in the same vCard/vCal, for example N (name) and FN (formatted name) cannot appear in the same vCard; Supported exclusion between parameters—parameters that cannot appear together in the same property, for example, the combination of TEL; HOME; WORK is not allowed; Supported priorities between parameters; if there are exclusive parameters in the same property—which one is preferred; for example CELL has higher priority than WORK; Supported dependencies between parameters; a parameter that can only appear in conjunction with certain parameters. For example, PREF (preferred) can only appear with either HOME, WORK, CELL, or FAX.

Another type of supported rule preferably includes restrictions on property values: such as Maximum Length, Allowed characters (e.g., numbers only) and Format (e.g., date). Yet another type of supported rule preferably includes mapping between proprietary properties of different devices, in order to permit synchronization between these different devices, for example by adjusting data and/or reformatting data so as to be acceptable by these different devices.

The principles and operation of the present invention may be better understood with reference to the drawings and the accompanying description.

Referring now to the drawings, FIG. 1 is a schematic block diagram of an exemplary system according to the present invention. As shown, a system 100 preferably features a device 102 and a server 104, which communicate through a network 106. Network 106 may optionally be a telephone network, a computer network or a combination thereof. Device 102 and server 104 preferably communicate according to a proprietary protocol, shown as an arrow labeled "MSync protocol".

Device 102 preferably features an agent 108 according to the present invention, which is more preferably a thin client. Agent 108 preferably communicates with a synchronization server 110 at server 104 as shown, according to the proprietary protocol.

Agent 108 preferably enables automatic synchronization of one or more data items, optionally without any user intervention, more preferably bi-directionally between server 104 and device 102. In a synchronization operation, preferably only the changes since last sync are exchanged between agent 108 and synchronization server 110. The data items may optionally include any type of content, including but not limited to one or more of PIM, media files or messages, preferably determined according to the user settings. The user can select the types of content to be synchronized, the memory to be used (phone memory, memory card, both), the frequency of synchronization, etc.

For such an automatic implementation, optionally agent 108 can be started periodically by a scheduler that can be local to device 102, or remote on server 104. Additionally or alternatively, one or more activities of agent 108 can be triggered by local events that occur on device 102, including but not limited to adding a contact, or taking a photograph.

On the other hand, optionally additionally or alternatively, manual upload and download for synchronization may be performed, such that agent 108 preferably allows the user to select one or more data items through the UI of the agent 108, such as one or more specific files to be uploaded to server 104, and/or one or more data items to be downloaded from server 104. Optionally such selection may be performed through an external user interface, such as a web browser for example for downloading from server 104 to agent 108.

Device 102 also preferably features a local storage 112 for storing one or more data items for operation by device 102, one or more of which are preferably synchronized through communication with synchronization server 110 at server 104 according to the proprietary protocol.

Server 104 also preferably features a database 114 for storing one or more items of information for operation by synchronization server 110 as described herein. Such items may optionally and preferably be used for backup and restoration of data, such that for example the user may optionally backup the content of device 102 to server 104, or restore the content of device 102 from server 104. Synchronization server 110 preferably obtains one or more data items from database 114 and provides them to agent 108 according to the proprietary protocol. Server 104 can optionally propagate the data that is received by one of the agents to one or a plurality of agents.

Database 114 may also optionally be used for storing one or more user configuration settings and/or one or more updates. The protocol preferably supports the dynamic management of user settings (e.g., sync schedule) and configuration parameters, which include global system parameters (e.g., server URL) and device-specific parameters (e.g., directories of images, audio, video, etc.). Settings and configuration parameters are stored in database 114 and optionally delivered to agent 108 upon installation and upgrade; optionally, if the user made one or more changes (for example optionally through agent 108) then these change(s) are preferably stored in database 114 for delivery to agent 108. This mechanism is central to achieve a smooth upgrade and to be able to control the settings of multiple devices for the same account. In this manner the user does not have to define his/her settings with each upgrade. The protocol also allows agent 108 to notify server 104 about changes that the user has made to his/her settings.

According to some embodiments of the present invention, agent 108 deletes the content of device 102 upon receiving a request from synchronization server 110, at which point device 102 is more preferably blocked for further synchronization. Such an implementation could optionally be activated in case of theft, for example.

According to other embodiments of the present invention, agent 108 may optionally be initiated automatically or manually. The user can manually start agent 108 from the menu of device 102; alternatively or additionally, server 104 may initiate such activities, more preferably for sync, backup, restore and wipeout operations, through remote activation, optionally and most preferably through a Communication Initiation Request (CIR). CIRs are optionally sent by the server 104 in order to wake up the agent 108 and start a specific session. CIRs can optionally be sent over different protocols such as SMS, UDP and SIP and thus can address the device through a mobile number (MSISDN), IP address or URL, accordingly. The actual invocation of the agent 108 depends on the platform, as previously described. The content of the CIR was also previously described.

While the session is managed in a standard manner (e.g., through a cookie or session ID in the URL), the mSync protocol preferably uses proprietary HTTP headers in order to manage transactions, PDUs and chunks. The body of HTTP(S) requests and responses depends on the PDU type. The mSync protocol preferably uses XML in order to exchange meta-data and the content itself is transferred in its original format: vCard for contacts, vCalendar for calendar events and tasks and binary format for media. CIRs are sent from the server 104 to the client (agent 108), typically over SMS with a designated port that is addressed to the client (agent 108). In more advanced networks, CIRs is preferably sent over UDP or SIP. The body of the CIR includes the command name (for initiating the right session) and a digital signature. A simplified variant of the mSync protocol is preferably used for interacting with the SIM Toolkit. In most cases, the STK application can only use the signaling channel for communication, and thus SMS is used as a transport layer for the mSync protocol. With SMS, each PDU is encoded in a binary format and is transferred over one or more SMS messages (i.e. chunks).

Figure 2:
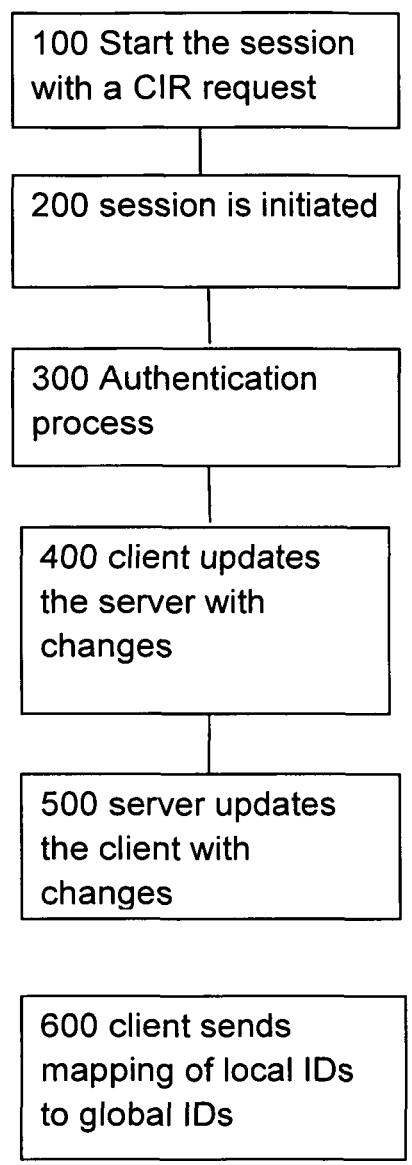
FIG. 2 is a schematic block diagram of an exemplary method for implementing the proprietary protocol according to the present invention.

FIG. 2 relates to an exemplary, illustrative method according to the present invention for implementation of the proprietary protocol according to the present invention. The protocol enables bi-directional synchronization of data between a client (agent) and a server. The protocol preferably supports any type of data, including but not limited to the following content types: contacts (vCard format); calendar events (vCalendar format); files (binary format); messages (SMS and MMS). The protocol preferably supports any type of batch sessions which does not required the interference of the user, including but not limited to the following sessions: Synchronization which is a Bi-directional exchange of changes that were made to relevant data elements on the device and the server, Backup which is a full transfer of relevant data elements from the device to the server. Restore which is a full transfer of relevant data elements from the device to the client and Wipeout which is a deletion of all data from the device. In addition to these batch sessions, the protocol also preferably supports interactive sessions. For upload, the user selects specific files from the device and uploads them to the server. For download, the user preferably selects specific files from the server and downloads them to the device.

As shown, the session preferably begins with a Communication Initiation Request (CIR), which is a command that is optionally sent by the server or by the user, by selecting a menu item in the client's UI, or by local device event in order to wake up the client and initiate a specific session (100). Next the session is initiated by the client, preferably through the agent, for example by sending a request to the server to start the session (200). Then the session starts with a negotiation, in which the server authenticates the client (300). This process is described in details in FIG. 4. Next the client and the server, in the case of a synchronization session, optionally exchange information in order to detect changes that were made in the device and in the server since last sync. The client sends to the server all the data elements that were added, changed or deleted in the device since last sync (400). This process is explained in more details in FIG. 3. The server sends to the client all the data elements that were added, changed or deleted in the server since last sync (500). The client also sends mapping of local IDs to global IDs for each data element that was provided by the server (600). The purpose of the global IDs and local IDs is also explained in FIG. 3. If the session is not a synchronization session but a session that was initiated by the client for uploading or downloading data, then the required data is uploaded or downloaded.

During the session one or more transactions are optionally sent by the client. A transaction is preferably an atomic operation on a specific type of content that is initiated by the client within a session. For example, a synchronization session can include several transactions: sync contacts, sync calendar, sync messages, etc. A transaction consists of one or more Protocol Data Units or PDUs. A single request is preferably sent as PDU (Protocol Data Unit) that is sent by the client to the server, or a single response that is returned by the server to the client. Each PDU is identified by a command type. A PDU can optionally be split into chunks. Each chunk is a part of a PDU that is sent over a single unit of the underlying transport protocol, such as a single HTTP request or an SMS message. The size of each chunk is preferably determined by one or more of the limitations of the device, the network and the transport protocol, or a combination thereof. The party (client or server) that receives the chunks is responsible for reassembling the PDU.

The splitting of the PDU into chunks is done as a result of the limitations of mobile devices and wireless networks. This is obvious when the transport protocol is SMS, but also with HTTP there are limitations that arise from the constraints of the device's memory and the network. The size of the chunk may optionally and preferably be set per device. Each chunk indicates its sequential number within the PDU and the total number of chunks in the PDU, thus allowing each side to keep track of these chunks and possibly re-transmit a specific chunk. The client and server exchange information in order to detect changes that were made in the device and in the server since last sync.

Figure 3:
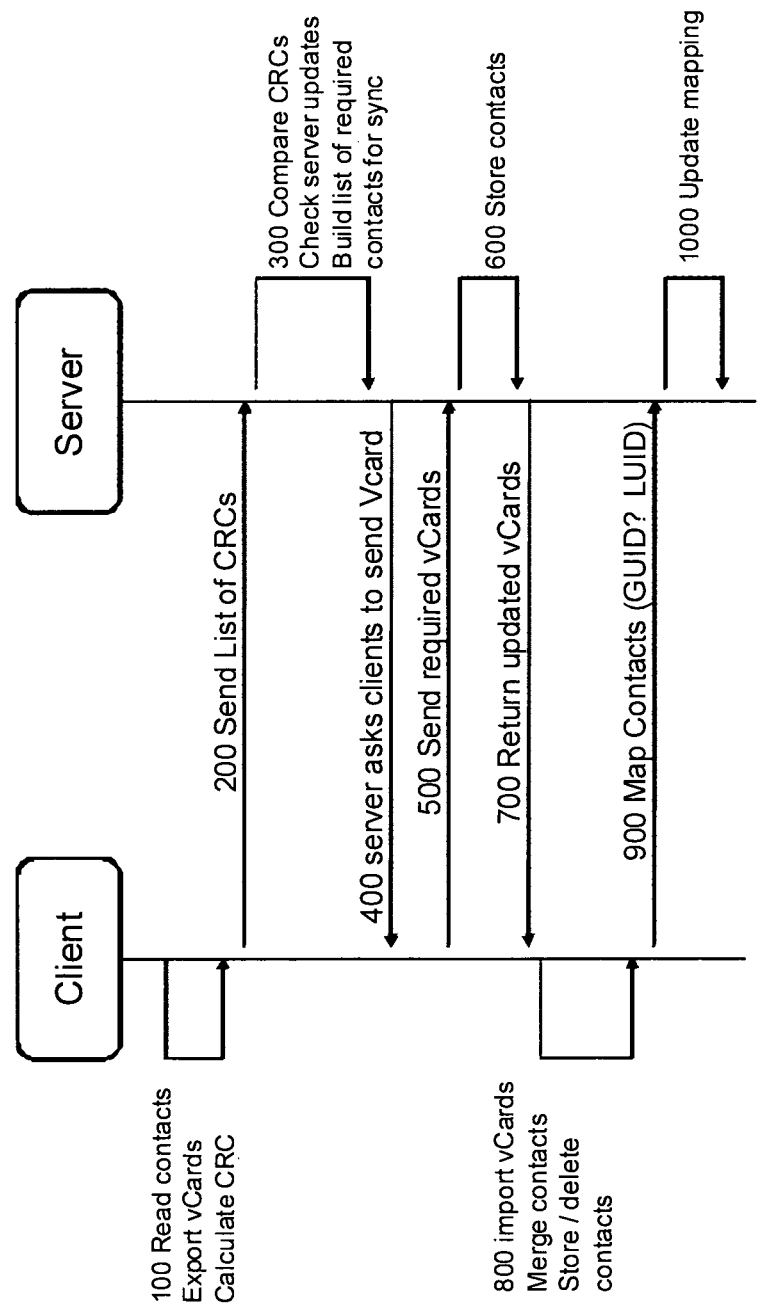
FIG. 3 is an exemplary diagram describing the flow of a contact synchronization transaction.

FIG. 3 is an exemplary diagram describing the flow of a contact synchronization transaction, which is included in a sync session. The protocol preferably uses checksum (CRC) in order to detect changes that were made to data elements on the device since last sync, and to minimize the traffic with regard to the non-limiting example of contact synchronization. Synchronization of files is optionally and preferably performed as described with regard to FIG. 2. At the beginning of a sync transaction the client calculates a CRC checksum for all the relevant data elements and compares it to the result of the previous sync. If there is no match (i.e. there were changes), the client sends the list of individual checksums for each element to the server. Then, the server checks exactly which elements were changed by comparing the new and previous checksums, and asks the client to send only the changed elements.

Referring now to the diagram, first the client/agent reads all the contacts from the address book of the device. It exports them into vCards, calculates CRC (checksum) for each vCard and compares the CRC of all CRCs to the previous result that was stored in the last synchronization (100). Then, if there is any change, the client sends the list of all CRCs to the server (200). Next the server checks which contacts were added changed or deleted since last synchronization, by comparing the CRCs to those that are stored in the database (300). Next the server requests the client to send the vCards of the contacts that were added or changed (400). Next the client sends the vCards that were added or changed (500). Next the server stores the changes in the database, while resolving conflicts and checking for duplicates (600).

Once the client has sent any changes to the server, the server sends to the clients the vCards that were added or changed and IDs of the contacts that were deleted on the server since last sync (700); optionally this stage may be performed before the client sends any changes to the server. Preferably, regardless of whether the client or the server sends the changes first, one of the two entities controls which changes are to be accepted in case both the server and the client report changes to the same vCard (i.e. conflict). In this example, preferably changes being reported by the client are accepted over changes reported by the server.

Next the client updates the address book of the device with the vCards that were received from the server (800). Next the client sends mapping of Global IDs to Local IDs for all updated added and deleted contacts to the server (900). In order to maintain the consistency of data across multiple sync sessions, the server must have accurate mapping between the global ID (GUID) of each synchronized data element (e.g., contact, calendar event, etc.) and the local ID (LUID) that is used for this element on the device. Then, whenever a data element is changed or deleted on the device, the server can easily correlate it to the corresponding record in the database, and thus avoid the creation of duplicates or data inconsistency. Mapping is preferably performed at the end of each sync transaction. For each data element that was provided by the server, the client sends a mapping between the global ID that was provided by the server and the local ID that was assigned by the device. If the local ID is not available, the client can use some other consistent unique identifier, such as the path in the local file system. Last the server updates the mapping in the database (1000).

Figure 4:
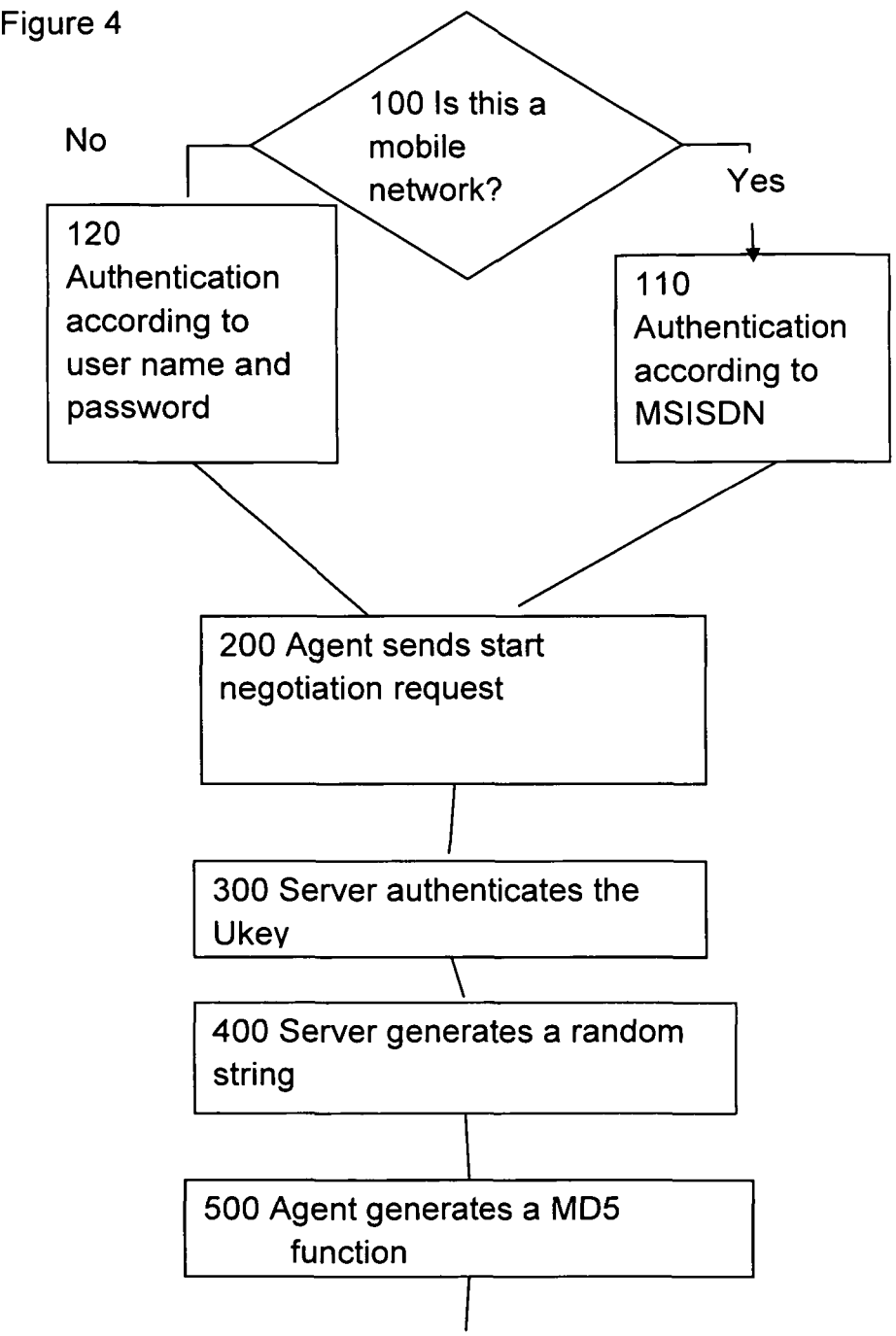
FIG. 4 is a detailed description of the authentication process.

FIG. 4 is a detailed description of the authentication process. This process is performed upon starting a new session. The process authenticates both the user and the device. The process enables the server to detect a new device or change of SIM cards, thus preventing fraud and errors. The agent sends user authentication information according to the network type (100).

The subscriber is then authenticated. Without wishing to be limited in any way, authentication of subscribers in the mobile network is typically based preliminary on MSISDN, which is provided by the network, based on interaction with the RADIUS server (Remote Authentication Dialed In User Service) (110). Authentication of users that are connected over the internet is based preliminary on user name/password, where the transport layer is HTTPS (120). Alternatively, if the device is SMS-enabled, it may optionally be activated over SMS by sending a key to device and verifying its MSISDN. In this case the MSISDN will be used as an identifier and a password is not required.

The agent then preferably sends a start negotiation request with the Ukey and Device ID and user ID (as described before) (200). Ukey is being used as a Unique ID per subscriber. It is provided by the server upon the activation of a new client and kept persistent by the client. Each device is primarily identified with a unique Device ID. Preferably the Device ID is the IMEI (GSM) or ESN (CDMA) of the device. Alternatively, the Server can allocate a unique Device ID during the detection of a new device instance. Each device is provisioned with a unique 64-bit symmetric Key. This Key is sent by the server to the client in a secure channel (either HTTPS or SMS) upon device activation and is used for the Secure Challenge Login procedure. The server finds the User Record according to the Ukey and preferably checks that it matches the MSISDN or alternatively compares to user name and password. If there is no match, the default behavior presents a message to the subscriber, warning that this device was already used in the system for another subscriber, and asks for confirmation or rejecting the session (300). Other types of policies may optionally be implemented, additionally or alternatively, in which the server performs one or more other activities if there is no match.

In the next stage, the server generates a random challenge string and returns it as a challenge to the agent (400). Agent takes the challenge string, concatenates the key to this string and calculates an MD5 function with the concatenated string (500). MD5 (Message-Digest algorithm 5) is a widely used, partially insecure cryptographic hash function with a 128-bit hash value. As an Internet standard (RFC 1321), MD5 has been employed in a wide variety of security applications, and is also commonly used to check the integrity of files. An MD5 hash is typically expressed as a 32-character string of hexadecimal numbers.

Agent sends the Complete Negotiation with the output of the MD5 function (600). Server validates the result and blocks the transaction if it does not match. If the result is valid, the Server returns the session ID (identifier) (700). From this point on, the Agent sends the Ukey, Device ID and Session ID in all subsequent requests in this session. In addition to authentication, in cases where access to the server is routed through the internet, encryption of the transmitted data is optionally available. Encryption can be achieved by a VPN (virtual private network) that is deployed between the operator network and the server, or by using HTTP for example.

Figure 5:
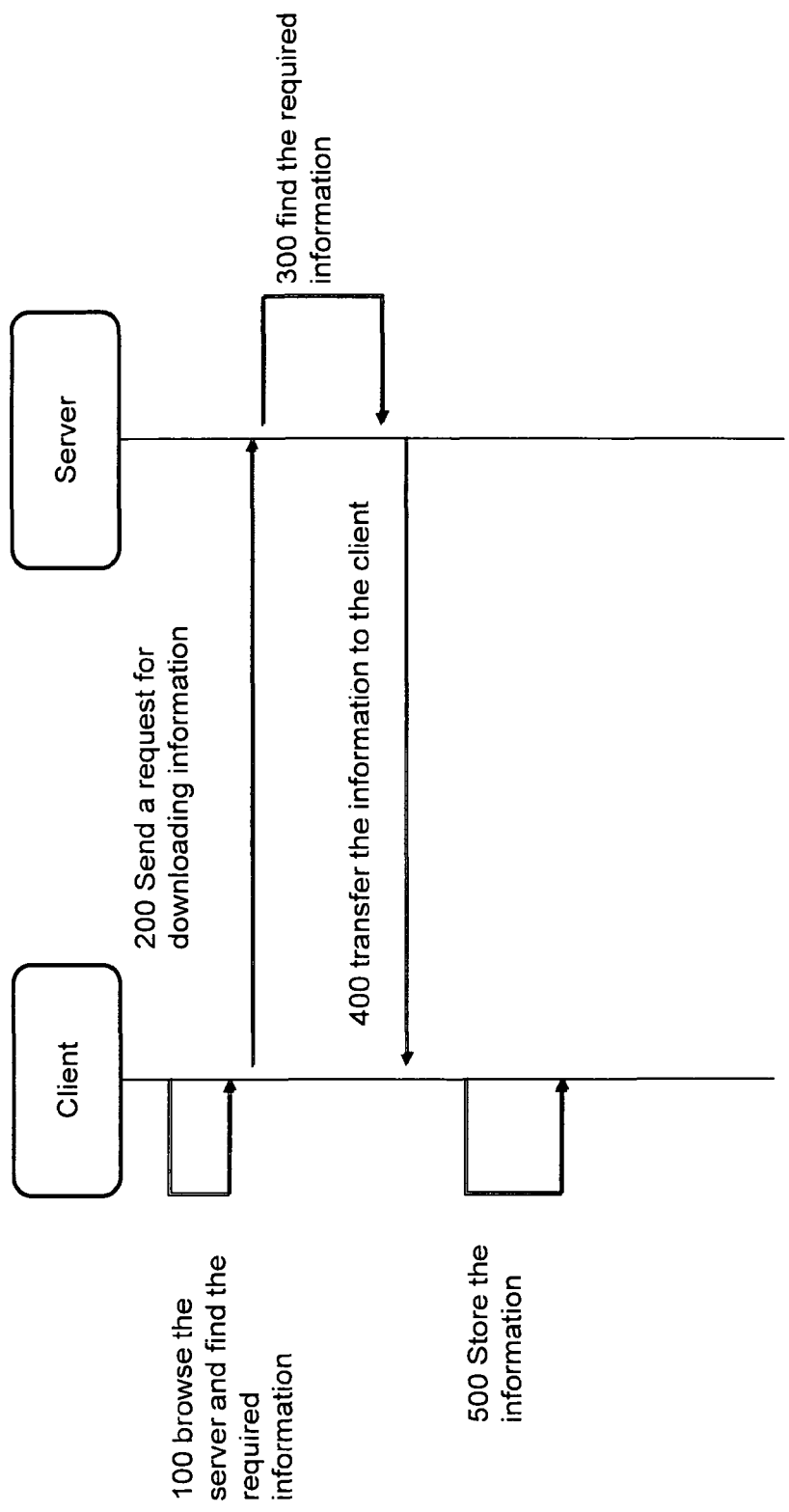
FIG. 5 is a diagram describing the scenario for downloading/deleting/browsing content.

FIG. 5 is a diagram describing the scenario for browsing/downloading content. The server optionally stores data that was previously uploaded by the agent (client). Data can be, for example, media files, such as pictures, video clips and music (e.g., in MP3 format). A list or other data selection mechanism is preferably presented to the user, for example optionally from the device on which the agent is installed, or alternatively from any device that features a web browser or other external interface. First the user finds the required data to be downloaded (100). When the user finds the data that needs to be downloaded, for example when the user wants to listen to a specific song or to view a specific picture, the user can see the list of data items that exist in his personal repository on the server either through the client or through a standard browser. Then, the user can mark specific items for download. The request is then sent to the server (200), preferably over HTTP. Upon receiving the request, and if the request is for downloading data, the server finds the required data items (300) and transfers it to the client (400). Large amounts of data are optionally and preferably sent as chunks. The data is then stored by the agent in the device (500).

Figure 6:
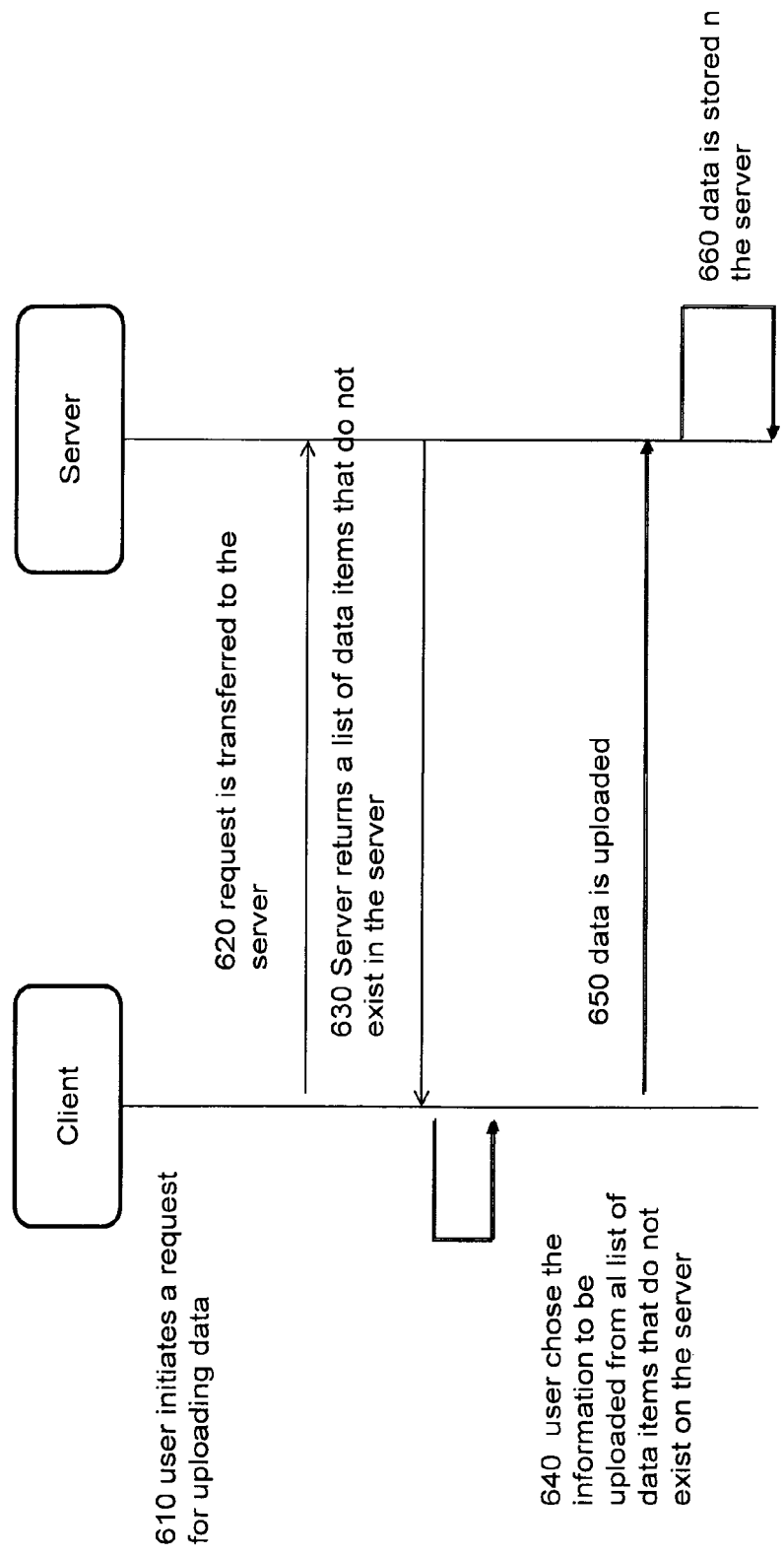
FIG. 6 is a diagram describing the scenario for uploading content

FIG. 6 is a diagram describing the scenario for uploading content from the device, by the agent, to the server. The agent optionally uploads specific data items for back-up purposes. For example, the user can select a specific photo and back it up. As shown in the non-limiting example in the figure itself, the user initiates a request for uploading data (610). Next the agent scans the local data store (e.g., file system) of the device and interacts with the server in order to compare the list of data items on the device to those that exist on the server (620). Next the server returns the list of data items that do not exist in the server (630). Then, the agent optionally presents only data items that do not exist on the server and the user chooses the items to be uploaded (640). Next the selected data is uploaded to the server (650), preferably over HTTP. Large amount of data is optionally and preferably sent as chunks. Then the server stores the data in the database (660).

Figure 7:
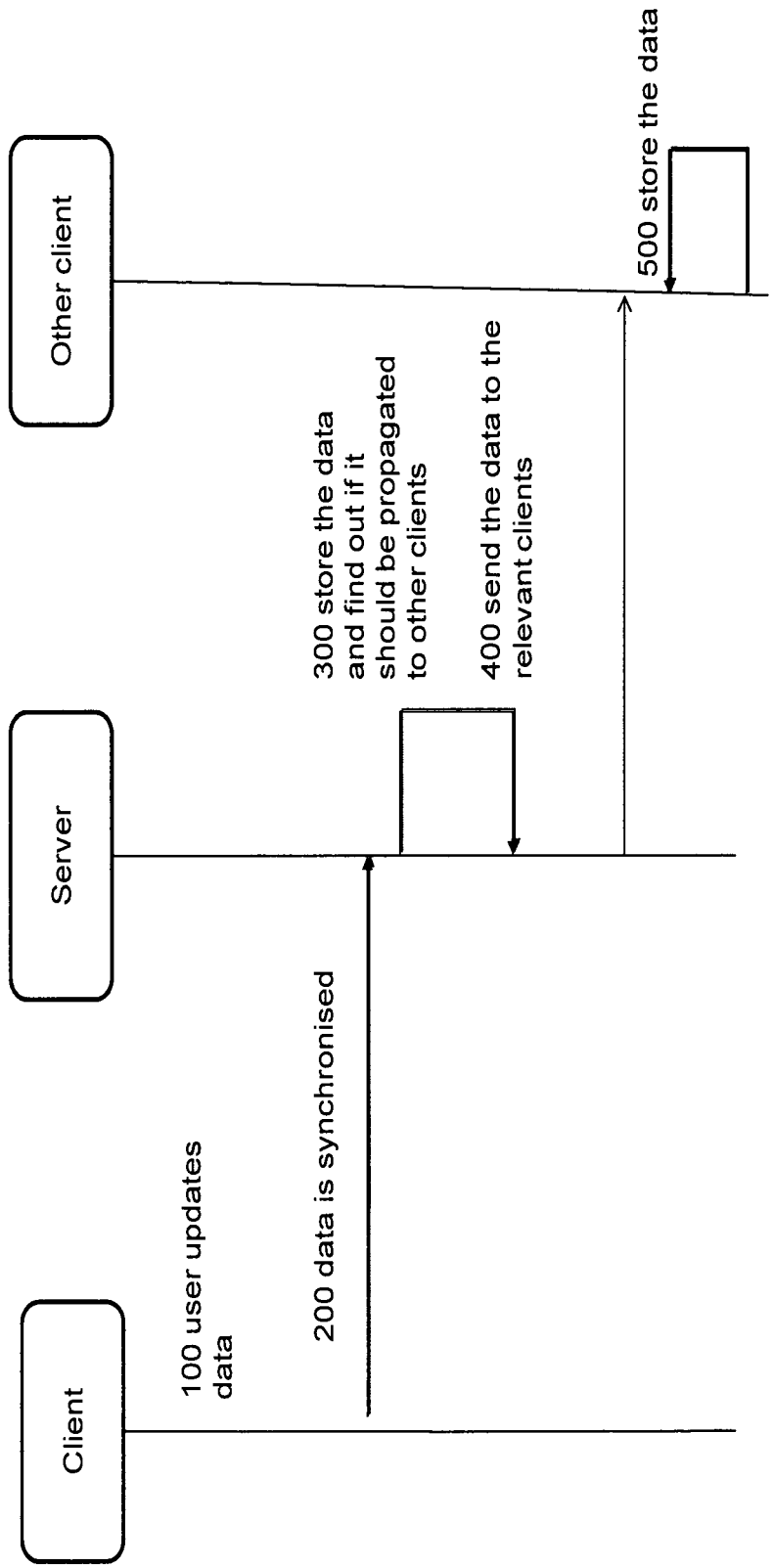
FIG. 7 is a diagram describing the scenario for propagating data from one agent to one or more agents.

FIG. 7 is a diagram describing the scenario for propagating data from one agent to one or more agents. In some cases the user wishes to propagate specific data, for example, his contact information or pictures, to other agents. In these cases the server is pre-configured to automatically propagate the data to other specific users upon receiving this data. The user updates his own data through the common interfaces on the device (100). The data is synchronized by the agent with the server (200), preferably over HTTP. Upon receiving the data, the server stores the data before propagating (300). The server propagates the data to the desired agents according to the configuration and user preferences (400). Upon receiving the information, each agent might optionally store the data on the device (500).

Figure 8:
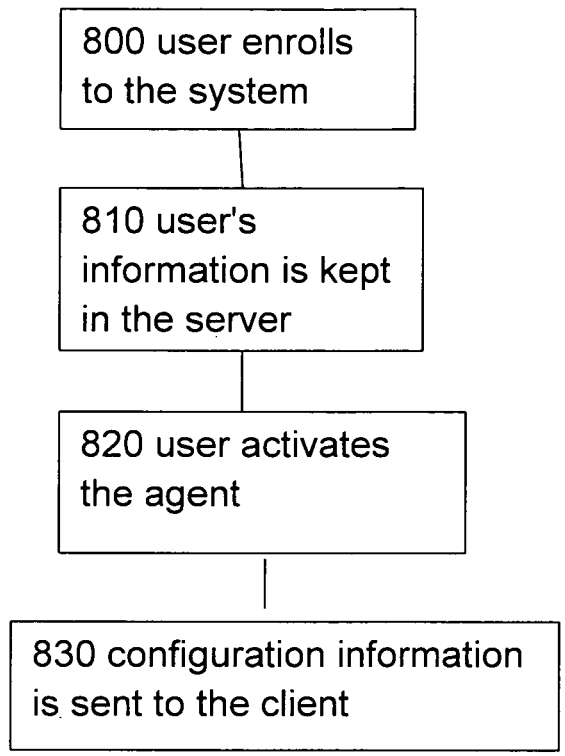
FIG. 8 is a diagram describing the automatic ad transparent configuration of the agent.

FIG. 8 is a diagram describing the automatic and transparent configuration of the agent. The agent is optionally automatically and transparently configured by the server. First the user enrolls to the system, optionally and preferably via the internet (800). Next the information about the user and the information that is needed for configuring its device is kept in the server (810). When the user downloads ad activates the agent (820), the configuration information is optionally and preferably transferred to the client (830). Data from the client to the server and from the server to the agent is preferably sent over HTTP or HTTPS.

Figure 9:
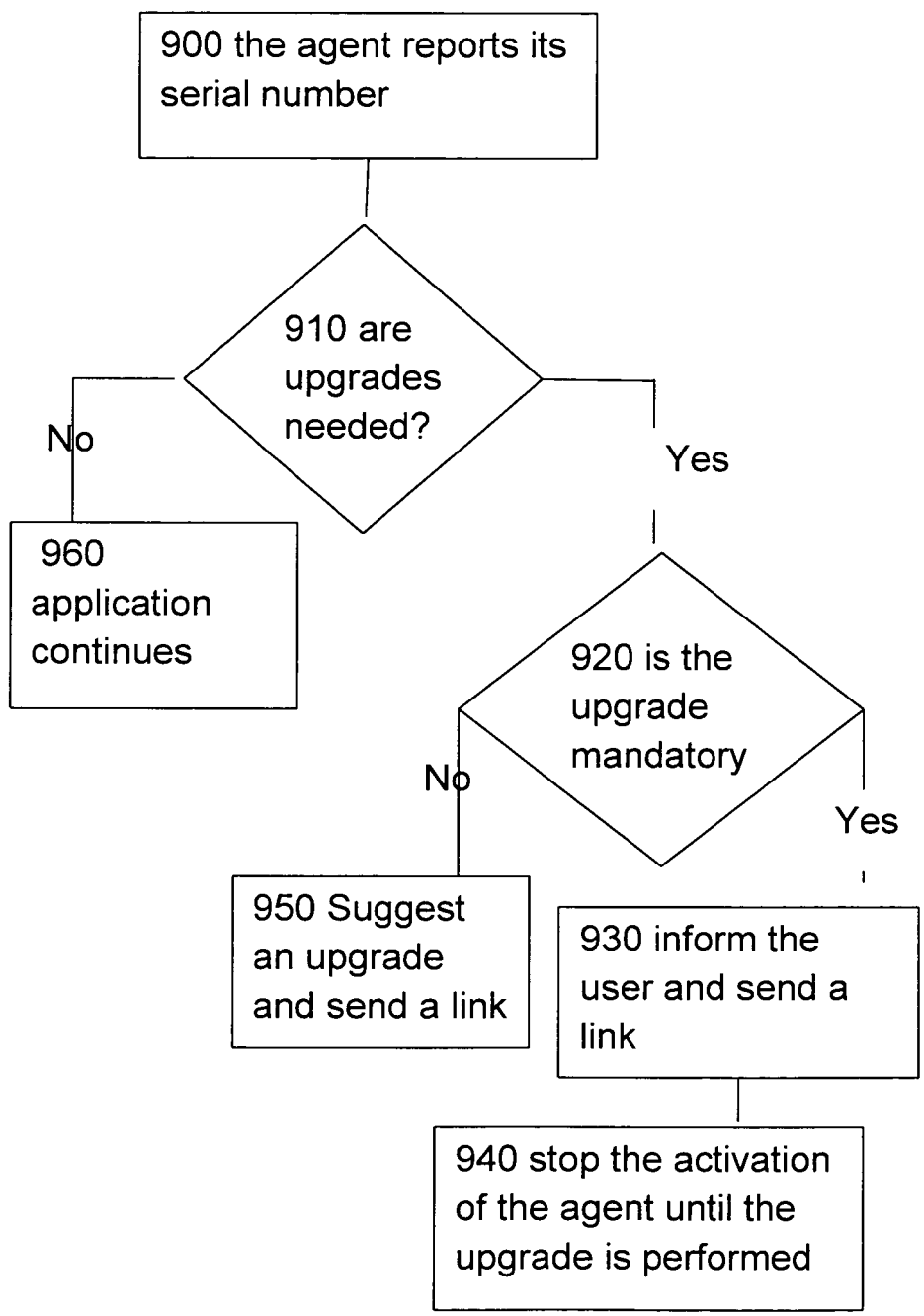
FIG. 9 is a diagram describing the OTA (over the air) upgrades.

FIG. 9 is a diagram describing the OTA (over the air) software upgrades. The upgrades are preferably performed whenever the agent is connected to the server. Upgrades are performed over the air without the need of the user to go to store for performing the upgrade. Mandatory upgrades, such as upgrades that include a major bug fix, are obligated by the system while non-mandatory upgrades are suggested to the user as an option. As shown with regard to the non-limiting example in the figure itself, the agent reports its version number to the server upon connecting with the server (900). Then the server checks if the software is up to date (910). If so than the agent continues and the process, described herein, is preferably performed transparently (960). Otherwise, if the software is not up to date, the server checks if an available upgrade is mandatory, for example, an upgrade that includes an important bug fix (920). If so then the link to the upgraded software is sent to the user, and the user is requested to perform an upgrade (930). Meanwhile the agent is preferably halted until the user performs the upgrade (940). The upgrade is preferably done from the device. If the upgrade is not mandatory then the user is preferably presented with the link and is suggested to perform the upgrade (950). However, the operation of the agent is not necessarily stopped.

Figure 10:
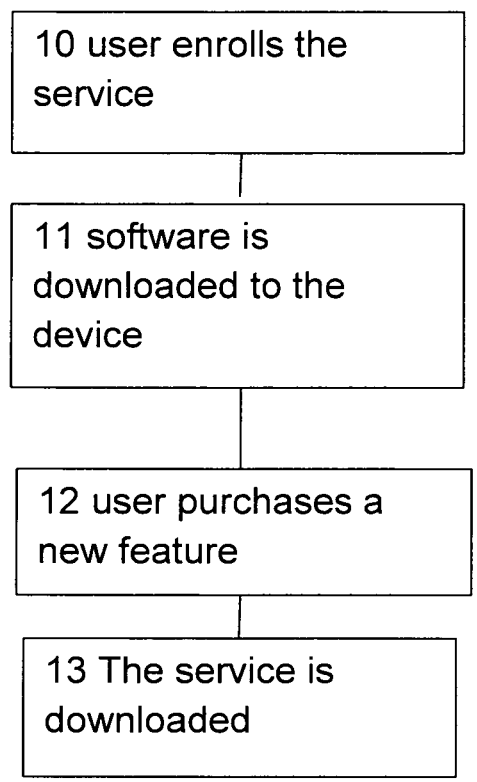
FIG. 10 is a diagram describing an exemplary process that enables branding.

FIG. 10 is a diagram describing an exemplary scenario of branding and customization. The present invention, in some embodiments, is optionally and preferably implemented by software and thus enables easy customization, as opposed to prior art implementations which are embedded in the firmware. It should be noted that the diagram is provided as an example only and other scenarios are possible as well. As shown, the user enrolls to the service (10). Then the operator-branded and customized software is downloaded to the device (11). In the next stage the user purchases or otherwise obtains a new feature (12). The new feature becomes available in the menu of the client (14) as a result of new settings that are provided by the server (13).

While the invention has been described with respect to a limited number of embodiments, it will be appreciated that many variations, modifications and other applications of the invention may be made.

What is claimed is:

1. A system, comprising:
   an agent installed at a device, the device including a hardware processor and being connected to a network, and the agent including a thin client installed on the device for handling synchronization of data with a server and further including a user interface, the agent initiated remotely by the server and performing a batch session in response to accepting a communication initiation request sent by the server to wake up the agent and start a specific session, the communication initiation request including a command, a type of media involved, an initiator of the communication initiation request, and a signature, wherein the communication initiation request is accepted by the agent only when the signature is valid, based on a private key of the device;

a synchronization module installed at the server, the server including a hardware processor and being connected to the network, wherein the synchronization module and the agent communicate for synchronization and wherein a majority of synchronization activities are performed by the server; and a repository stored at the server, the repository containing device capabilities and limitations for the device, such that the server adapts the data to the capabilities and limitations of the device during synchronization, handles data received from the device, and merges the received data with data stored in a database, the server distinguishing between a property that was deleted in the device, and a property that is missing because the device's capabilities do not support the property, based on formatting rules for merging the received data;

wherein the repository includes a profile for each of a plurality of devices, and each profile includes a preferred client type, at least one vCard formatting rule, at least one vCalendar formatting rule, at least one calendar restriction, at least one capacity limitation, at least one file system directory, and at least one category mapping of the device associated with the profile;

wherein, upon receiving a request from the server, the agent deletes all content of the device and blocks the device from further synchronization with the server.

2. The system of claim 1, wherein at least one device specific feature is enabled by the server and not by the agent.

3. The system of claim 2, wherein the agent is configured for a platform and wherein one or more device specific features for the device are handled by the server.

4. The system of claim 3, wherein all device related customization independent of the platform is handled by the server.

5. The system of claim 1, wherein the synchronized data includes one or more of contacts in a vCard format, calendar events and tasks in a vCalendar format, files in a binary format, messages including at least one of a short message service (SMS) and a multimedia messaging service (MMS), pictures, audio data and video data.

6. The system of claim 5 wherein the server adapting the data to the capabilities and limitations of the device during synchronization includes at least one of the server splitting a single instance of a contact in vCard format into multiple instances, and the server splitting a single instance of a calendar event in vCalendar format into multiple instances, due to the capabilities and limitations of the device.

7. The system of claim 1, wherein the server and the device communicate through the network.

8. The system of claim 7, wherein the network includes a plurality of networks, wherein each network can be wireless and/or fixed.

9. The system of claim 1, wherein the device is a telephone.

10. The system of claim 1, wherein the device is any mobile communication device.

11. The system of claim 10, wherein the mobile communication device includes a voice and/or a video communication capability.

12. The system of claim 1 wherein a local event occurring on the device triggers a starting of the agent, the local event including at least one of adding a contact and taking a photograph.

13. The system of claim 1 wherein upon receiving the data from the device during synchronization, the server stores the data in the database and automatically propagates the data to at least one user that the server is pre-configured to automatically propagate the data to according to user preferences.

14. The system of claim 1 wherein a body of the communication initiation request includes a name of the command for starting the specific session and the signature.

15. The system of claim 1 wherein the signature is a result of an MD5 function on the command included in the communication initiation request and the private key, and wherein the private key identifies the device.

16. A method, comprising:
providing an agent for being operated by a device, the device including a hardware processor and being connected to a network, and the agent including a thin client installed on the device for handling synchronization of data and further including a user interface, the agent initiated remotely and performing a batch session in response to accepting a communication initiation request to wake up the agent and start a specific session, the communication initiation request including a command, a type of media involved, an initiator of the communication initiation request, and a signature, wherein the communication initiation request is accepted by the agent only when the signature is valid, based on a private key of the device;

providing a server, the server including a synchronization module and hardware processor, and being connected to the network;

providing data being installed on the agent and on the server;

providing automatic synchronization of the data between the agent and the synchronization module; and providing a repository stored at the server, the repository containing device capabilities and limitations for the device, such that the server adapts the data to the capabilities and limitations of the device during synchronization, handles data received from the device, and merges the received data with data stored in a database, the server distinguishing between a property that was deleted in the device, and a property that is missing because the device's capabilities do not support the property, based on formatting rules for merging the received data;

wherein at least one device specific feature is enabled by the server and not by the agent;

wherein the repository includes a profile for each of a plurality of devices, and each profile includes a preferred client type, at least one vCard formatting rule, at least one vCalendar formatting rule, at least one calendar restriction, at least one capacity limitation, at least one file system directory, and at least one category mapping of the device associated with the profile;

wherein the agent is initiated remotely by the server, and the communication initiation request accepted by the agent is sent from the server;

wherein, upon receiving a request from the server, the agent deletes all content of the device and blocks the device from further synchronization with the server.

17. The method of claim 16, wherein the agent is configured for a platform and wherein one or more device specific features for the device are handled by the server.

18. The method of claim 17, wherein all device related customization independent of the platform is handled by the server.

19. The method of claim 16 wherein a checksum is used in order to detect changes that were made to the data on the device since last sync, and to minimize the traffic in the synchronization process by transferring only the data that has been changed.

20. The method of claim 16, wherein the synchronized data includes one or more of contacts in a vCard format, calendar events and tasks in a vCalendar format, files in a binary format, messages including at least one of a short message service (SMS) and a multimedia messaging service (MMS), pictures, audio data and video data.

21. The method of claim 20, wherein the files are transferred in their original binary format.

22. The method of claim 16 wherein the agent user interface and user interface flow can be customized.

23. The method of claim 22, wherein the customization occurs according to one or more of changing icons, menus per operator and/or service.

24. The method of claim 16 wherein the synchronized data is divided into chunks in order to enable the transferring of a large amount of data.

25. The method of claim 16 wherein both a user and the device are authenticated before performing any data transaction.

26. The method of claim 16 wherein an over the air (OTA) protocol is used for updating the agent on the device.

27. The method of claim 16 wherein the agent is remotely initiated using a communication initiation request (CIR).

28. The method of claim 16 wherein the agent is automatically configured without user intervention.

29. The method of claim 16 wherein data can be downloaded from the agent to the server.

30. The method of claim 16 wherein data can be uploaded from the server to the agent.

31. The method of claim 30 wherein the agent presents to a user only the data that is missing in the server.

* * * * *